US006708414B2

United States Patent
Clinton

(10) Patent No.: US 6,708,414 B2
(45) Date of Patent: Mar. 23, 2004

(54) APPARATUS FOR CONVERTING AN OPTICAL THEODOLITE INTO A LASER THEODOLITE

(75) Inventor: Joseph De Witt Clinton, 334 MacKenzie Dr., West Chester, PA (US) 19380-3816

(73) Assignee: Joseph De Witt Clinton, West Chester, PA (US)

( * ) Notice: Subject to any disclaimer, the term of this patent is extended or adjusted under 35 U.S.C. 154(b) by 0 days.

(21) Appl. No.: 09/826,276

(22) Filed: Apr. 4, 2001

(65) Prior Publication Data

US 2001/0027611 A1 Oct. 11, 2001

(30) Foreign Application Priority Data

Apr. 5, 2000 (GB) .............................................. 0008400

(51) Int. Cl.[7] .................................................. G01C 5/00
(52) U.S. Cl. ....................... 33/290; 33/227; 33/DIG. 21
(58) Field of Search .......................... 33/290, 291, 292, 33/281, 282, 285, 286, DIG. 21, 227

(56) References Cited

U.S. PATENT DOCUMENTS

| 4,717,251 A | * | 1/1988 | Wells et al. ................... 33/291 |
| 4,988,192 A | * | 1/1991 | Knittel .......................... 33/281 |
| 5,159,760 A | * | 11/1992 | Spiegel et al. ................. 33/292 |
| 5,243,398 A | * | 9/1993 | Nielsen ......................... 33/290 |
| 5,367,779 A | * | 11/1994 | Lee ............................... 33/290 |
| 5,838,431 A | * | 11/1998 | Hara et al. ..................... 33/290 |
| 5,936,721 A | * | 8/1999 | Ohtomo et al. ................ 33/286 |
| 5,978,076 A | * | 11/1999 | Kitajima ....................... 33/290 |
| 6,076,266 A | * | 6/2000 | Beckingham et al. ......... 33/281 |
| 6,513,251 B2 | * | 2/2003 | Huang et al. .................. 33/286 |

FOREIGN PATENT DOCUMENTS

| DE | 287776 | 4/1989 |
| JP | 55140103 | 11/1980 |
| JP | 355140103 A | * 11/1980 |
| NL | 8802684 | 2/1988 |

* cited by examiner

*Primary Examiner*—Diego Gutierrez
*Assistant Examiner*—Madeline Gonzalez
(74) *Attorney, Agent, or Firm*—Dann Dorfman Herrell and Skillman, P.C.

(57) ABSTRACT

Apparatus (4) for converting an optical theodolite (2) into a laser theodolite, which apparatus comprises a laser diode adapter (6) for connection to the optical theodolite in place of an eyepiece of a telescope (8) of the optical theodolite, and driver means (10) for the laser diode adapter (6); the laser diode adapter (6) comprising a housing (12), a laser diode (14); a holographic image reshaping lens (51), and a focusing lens (52) in the housing (12), and an externally threaded male portion (16) for screwing into the telescope (8) in place of the eyepiece; and the driver means (10) having securing means (18) for securing the driver means (10) to the optical theodolite (2) remote from the laser diode adapter (6).

8 Claims, 6 Drawing Sheets

APPARATUS FOR CONVERTING AN OPTICAL THEODOLITE INTO A LASER THEODOLITE

This invention relates to apparatus for converting an optical theodolite into a laser theodolite.

FIELD OF THE INVENTION

Optical theodolites and laser theodolites are well known.

DESCRIPTION OF RELATED ART

There are many applications where a theodolite may be used as a pointing device when precision azimuth and elevation locations of a point are desired. If an optical theodolite is used, at least two persons are required and lots of patience. One person has to operate the optical theodolite, whilst the other person has to mark the point under guidance from the person operating the optical theodolite. It is therefore preferable to use a laser theodolite. The laser theodolite points a laser which gives a spot on the place to be marked. Thus only one person is required to operate the laser theodolite and considerable time is saved.

The known laser theodolites are expensive. Most precision laser theodolites are designed for long range day light use as surveying instruments. The laser usually consists of a high output device built into the laser theodolite. The result is a laser theodolite which is expensive.

Range finder instruments are also known. These known range finder instruments are often designed with built in lasers and they serve a unique purpose for measuring distance. Even if the range finder instruments are considered as suitable for attachment to optical theodolites, the range finder instruments have unique properties which make them expensive for consideration as attachment to optical theodolites.

Low cost optical theodolites are known. A retrofit laser attachment for converting such low cost optical theodolites into laser theodolites is known. However, the retrofit laser attachment is expensive and it is designed for a specific theodolite. The known retrofit laser attachment has also been designed for long range day light use as a surveying instrument.

BRIEF SUMMARY OF THE INVENTION

There is a need for apparatus for converting an optical theodolite into a laser theodolite, which apparatus is inexpensive, easily mountable to an optical theodolite, and accurate. It is an aim of the present invention to provide such apparatus.

Accordingly, in one non-limiting embodiment of the present invention there is provided apparatus for converting an optical theodolite into a laser theodolite, which apparatus comprises a laser diode adapter for connection to the optical theodolite in place of an eyepiece of a telescope of the optical theodolite, and driver means for the laser diode adapter; the laser diode adapter comprising a housing, a laser diode, a holographic image reshaping lens, and a focusing lens in the housing, and an externally threaded male portion for screwing into the telescope in place of the eyepiece; and the driver means having securing means for securing the driver means to the optical theodolite remote from the laser diode adapter.

The apparatus of the present invention can be relatively inexpensively produced as compared with known apparatus. The apparatus is easily able to be mounted to an existing optical theodolite. Still further, the apparatus is able to be conveniently portable. If desired, the apparatus may be low powered for short range low light.

In a first form of the apparatus of the invention, the laser diode adapter has the above mentioned components. The apparatus may then be one in which the laser diode adapter and the driver means are constructed such that they do not interfere with the required operational movements of the formed laser theodolite. In a second form of the apparatus, it may be one in which the laser diode adapter includes a beam splitter and an extension lens in the housing, and in which the laser diode adapter and the laser means are constructed such that they retain the optical sighting ability of the telescope of the formed laser theodolite.

The apparatus may be one which is able to be attached to the formed laser theodolite between the telescope and the eyepiece or between the formed laser theodolite diagonal eyepiece and the eyepiece.

The apparatus may include adjuster means for adjusting the laser diode in the housing such that the laser diode is able to be aligned with the telescope's optical path.

Preferably, the adjuster means are screws. Other types of adjuster means may however be employed.

In the above mentioned first form of the apparatus, the apparatus may be one in which the externally threaded male portion is on a front face of the housing. In the above mentioned second form of the apparatus, the apparatus may be one in which the externally threaded male portion is in the front face of the housing and an internally threaded female portion is in the back face of the housing. Other arrangements may however be employed.

Preferably, the securing means is a releaseable securing means for enabling the driver means to be removed from the laser theodolite and stored when the apparatus is not in use.

Preferably, the releaseable securing means is a male and female fabric patch securing means. Also, preferably, the male portion of the male and female fabric patch securing means is attached to the driver means, and the female portion of the male and female fabric patch securing means is attached to the theodolite. Other types of securing means may be employed if desired.

BRIEF DESCRIPTION OF THE SEVERAL VIEWS OF THE DRAWINGS

Embodiments of the invention will now be described solely by way of example and with reference to the accompanying drawings in which.

DETAILED DESCRIPTION OF THE DRAWINGS

Figure 1:
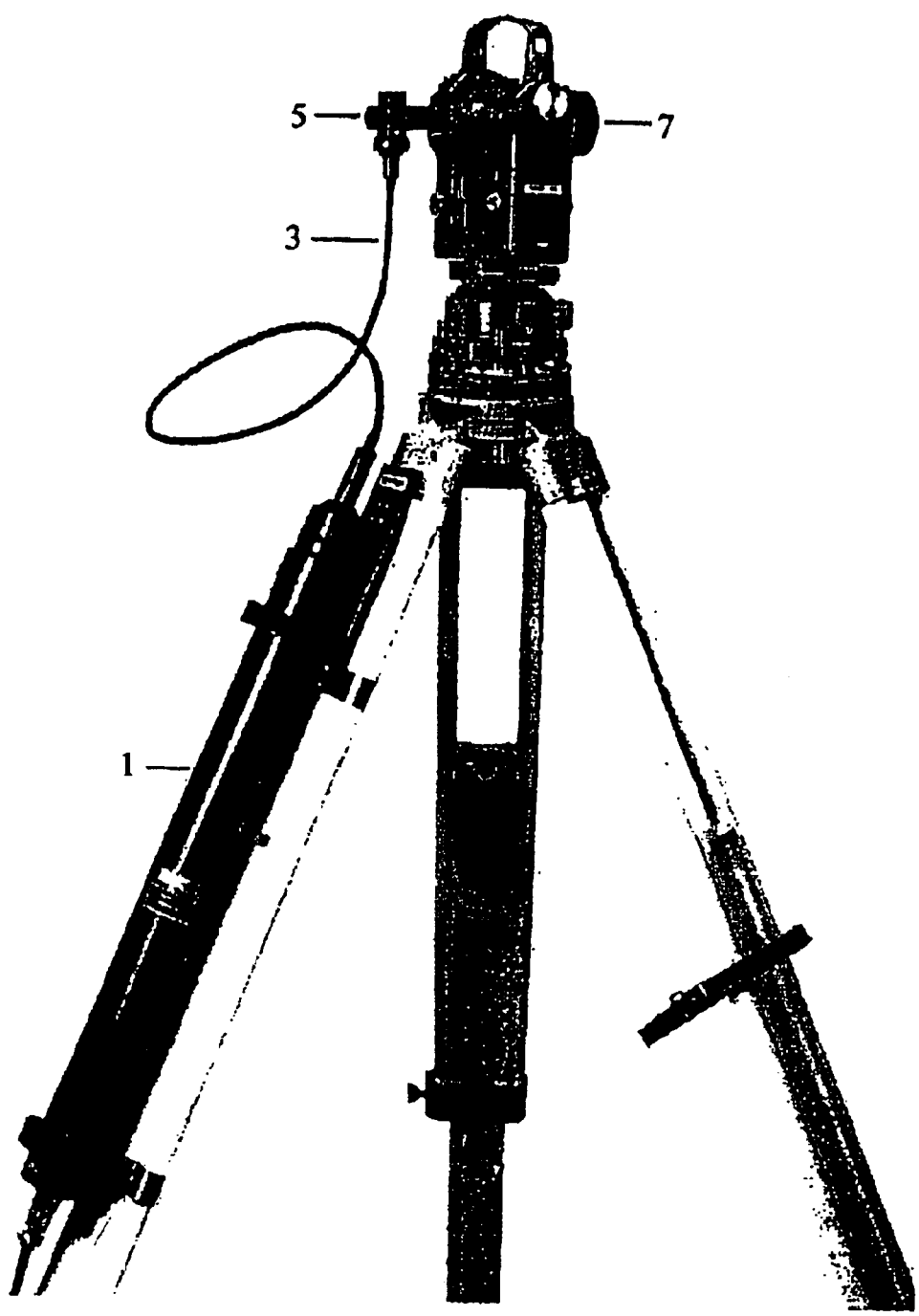
FIG. 1 shows a known state of the art retrofit laser adapter.

Referring to FIG. 1, there is shown a state of the art retrofit laser 1 having a built-in power converter attached, by way of a fiber optic cable 3, to a laser eyepiece 5. The laser eyepiece 5 replaces the conventional optical eyepiece attached to the theodolite. A counter-weight 7 is required to offset the weight of the laser eyepiece 5 and the fiber optic cable 3. This system is expensive, bulky, and limited to specific equipment for which it was designed, using an unconventional bayonet fastening system.

Figure 2:
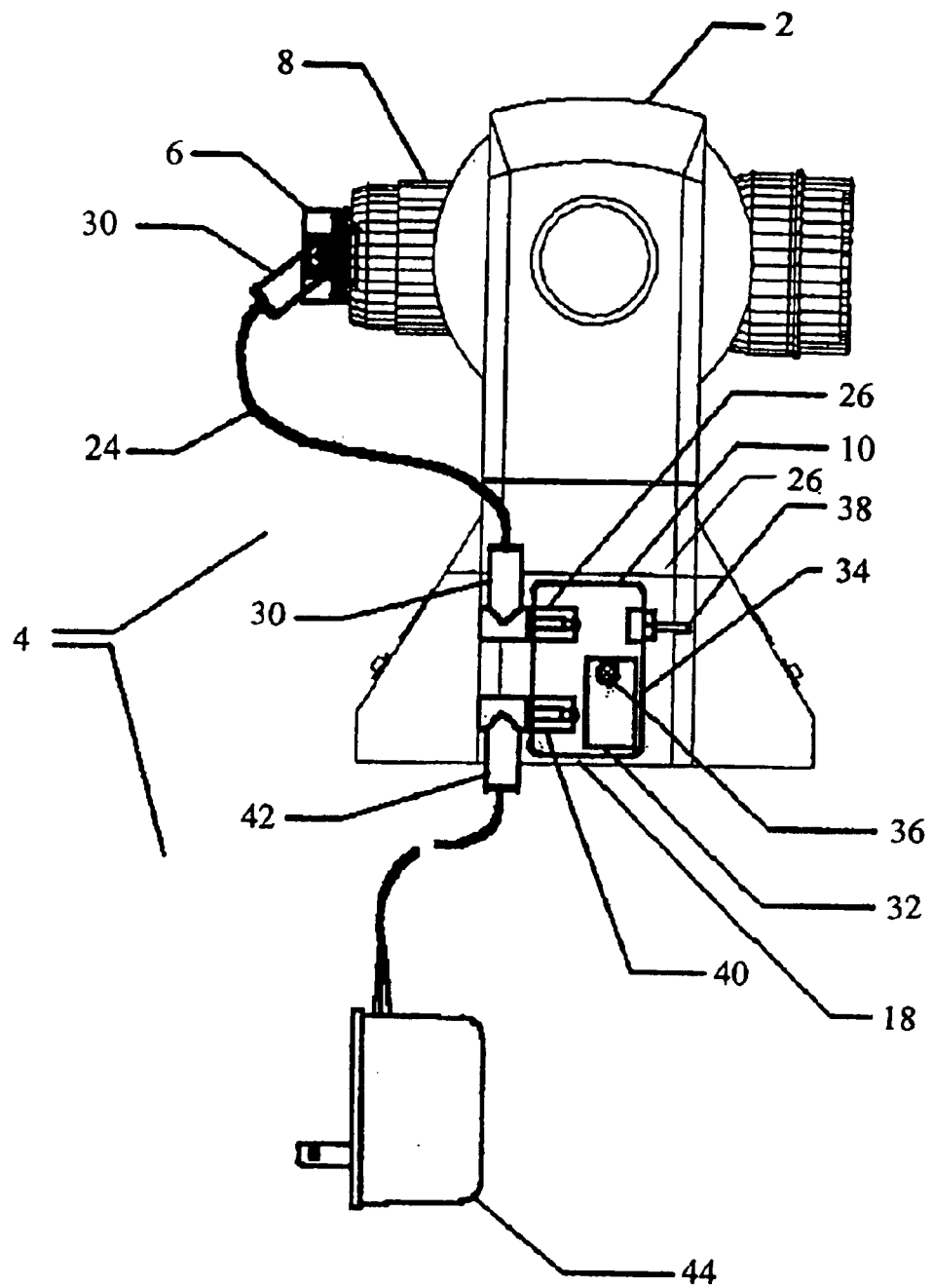
FIG. 2 shows apparatus of the present invention in use and having converted an optical theodolite to a laser theodolite.
Figure 3:
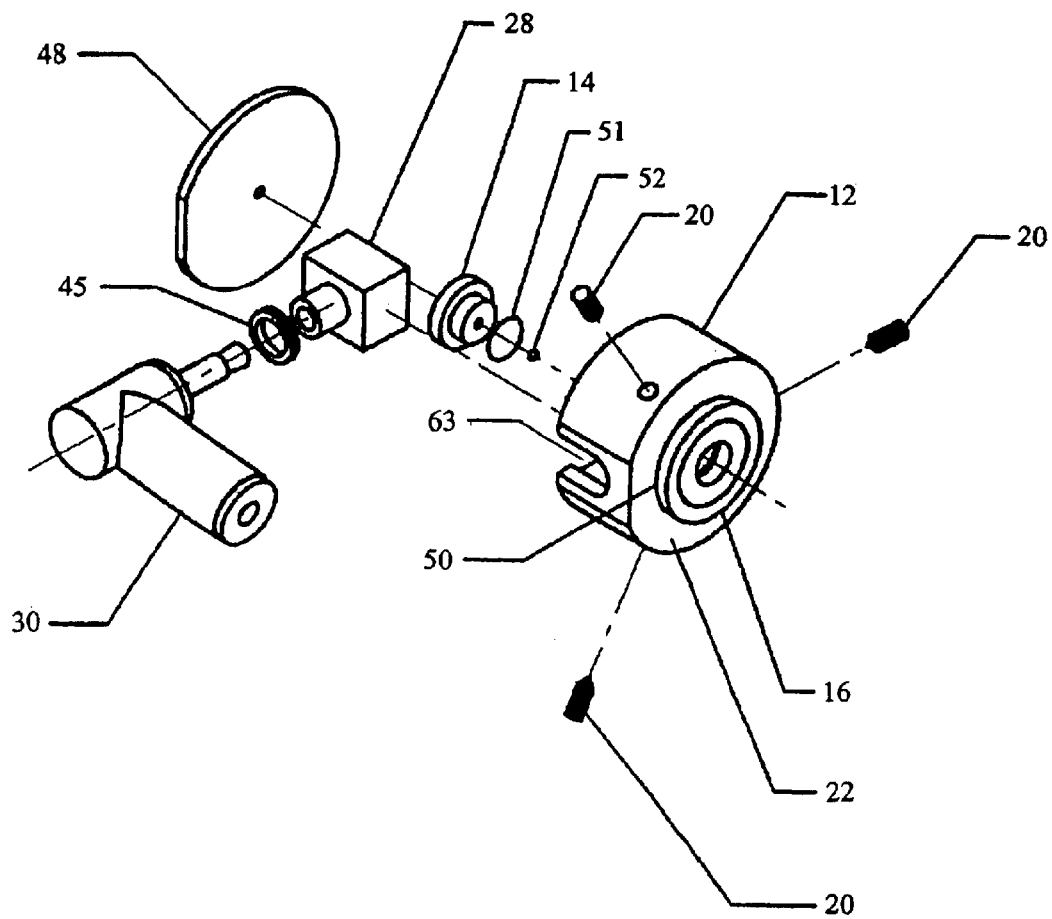
FIG. 3 is an exploded view of a laser diode adapter part of the apparatus shown in FIG. 2.
Figure 4:
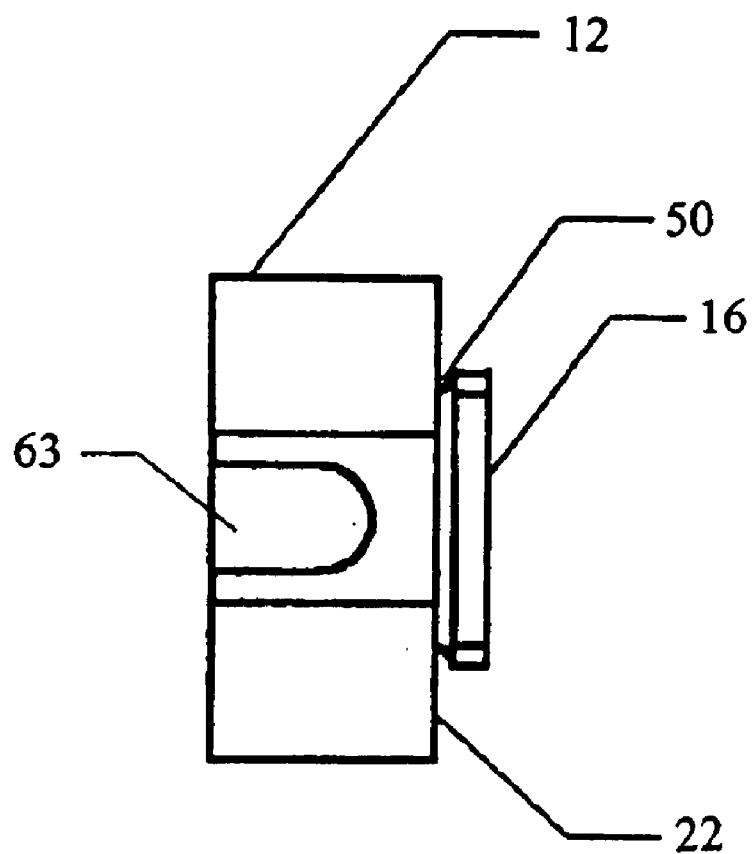
FIG. 4 is a detailed view of the housing shown in FIG. 3.

Referring to FIGS. 2–4, there is shown a theodolite 2 which was an optical theodolite but which has been converted by apparatus 4 into a laser theodolite. The apparatus 4 comprises a laser diode adapter 6 which has been connected to the theodolite 2 in place of an eyepiece (not shown) of a telescope 8 of the theodolite 2. The apparatus 4 also comprises driver means 10 for the laser diode adapter 6.

The laser diode adapter 6 comprises a housing 12, a laser diode 14, a holographic image reshaping lens 51, and a focusing lens 52 in the housing 12, and an externally threaded male portion 16 for screwing into the telescope 8 in place of the eyepiece. The holographic image reshaping lens 52 reshapes the normal elliptical laser beam emitted from the laser diode into a circular beam. The focusing lens 52 focuses the laser spot to a fine point on the plane of the telescope reticle. The driver means 10 has securing means 18 for securing the driver means 10 to the theodolite 2 remote from the laser diode adapter 6. The laser diode adapter 6 and the driver means 10 are constructed such that they do not interfere with the required operational movements of the theodolite 2.

The apparatus 4 includes adjuster means in the form of adjuster screws 20 for adjusting the laser diode 14 and its associated optics, the holographic image reshaping lens 51 and focusing lens 52 in the housing 12 such that the laser diode 14, holographic image reshaping lens 51 and focusing lens 52 are able to be aligned with the telescope's optical path.

As best seen from FIG. 3, the externally threaded male portion 16 is on a front face 22 of the housing 12.

The securing means 18 is a releaseable securing means for enabling the driver means 10 to be removed from the theodolite 2 and stored when the apparatus 4 is not in use. The releaseable securing means 18 is a male and female fabric patch securing means in which the male portion is attached to the driver means 10 and the female portion is attached to the theodolite 2.

As shown in FIG. 2, a cable 24 transfers the necessary power to drive the laser diode 14 from an output socket 26 on the driver means 10 to an input socket 28 (see FIG. 2) on the laser diode adapter 6. The input socket 28 is of the same type as the output socket 26. The cable 24 includes a swivel jack 30 which is able to swivel in the output socket 26. A slot 63 allows the input socket 28 to accept the swivel jack 30.

A driver circuit 32 is provided to drive the laser diode 14. The driver circuit 32 is contained in a housing 34 which is attached as shown to the side of the theodolite 2 by the securing means 18. This enables the driver means 10 to be removed and stored when the apparatus 2 is not in use.

A light emitting diode indicator light 36 is illuminated whilst the laser is in use. A low voltage single throw, single pole type switch 38 is secured to the housing 34 as shown. The switch 38 allows for control of power to the laser diode 14.

An input connector 40 is provided on the housing 34 as shown and this input connector 40 is of a different type to the output socket 26 and the input socket 28. This ensures that a power supply jack 42 cannot inadvertently be connected directly to the laser diode 14.

A power supply 44 has an input of 120 volts AC. The power supply 44 converts a low voltage DC output for the driver circuit 32.

As best seen from FIG. 3, the laser diode 14 is placed as a loose fit in the housing 12. The laser diode 14 is a low power laser diode 14. The adjustment screws 20 are angled and placed in such a manner as to be used to secure the laser diode 14 and also to provide adjustment for alignment with the optical axis of the theodolite telescope 8. The power for the laser diode 14 is provided through the input socket 28 that is contained within the apparatus 4. The input socket 28 is secured to the apparatus 4 with a nut 45. The apparatus 4 is closed off with an end cap 48.

The externally threaded male portion 16 is cut into the mounting end of the apparatus 4 and it is cut such as to match the internal thread form of the theodolite telescope 8. An undercut 50, best shown in FIG. 4, is provided to ensure consistent alignment each time the apparatus 4 is mounted to the telescope 8. The front face 22 of the housing 12 is precision machined to form a precision machined mounting surface which again helps to ensure constant alignment each time the apparatus 4 is mounted to the theodolite telescope 8.

The apparatus 4 thus provides a low powered laser diode 14 which is fitted to the internal thread of the telescope 8, where the eyepiece of the theodolite 2 would normally be. The apparatus 4 uses the optics of the theodolite 2 to provide a collimated beam of light that may be focused at a given distance. The laser diode 14 may be adjusted by means of the adjustment screws 20 in order to align perfectly with the optical path of the telescope 8. This adjustment capability ensures that the accuracy of the theodolite 2 is maintained for measuring purposes.

The laser diode adapter 6 of the apparatus 4 is compact and shaped as illustrated in order to ensure that it will not interfere with the yoke 2b of the theodolite 2, and to ensure that it will allow the theodolite 2 to swing through its full sweep in elevation.

The driver means 10 for the laser diode 14 is located separately from the laser diode 14 in order to further assist in full physical movement of the theodolite 2. The cord 24 has the swivel jack 30 for enabling the telescope to swivel as necessary. This ensures that there is no interference with the swivelling of the telescope 8 through its full sweep in elevation. The position of the driver means 10 is chosen so that it does not interfere with the full azimuth sweep of the theodolite. The driver means 10 is constructed to be small and compact.

As can be seen from the above description, the apparatus 4 of the present invention is able to provide a collimated beam of light that may be focused at any given distance through the optics of the theodolite 2. The accuracy of the apparatus 4 is preserved using the adjustment screws 20. The apparatus 4 is compact so that the theodolite 2 has full rotation of elevation, full rotation of azimuth, and the yoke 2b of the theodolite is able to swing through full rotation of elevation. The apparatus 4 is able to be installed without damage to the original optical theodolite, and the apparatus 4 can be removed and stored when not in use.

Figure 5:
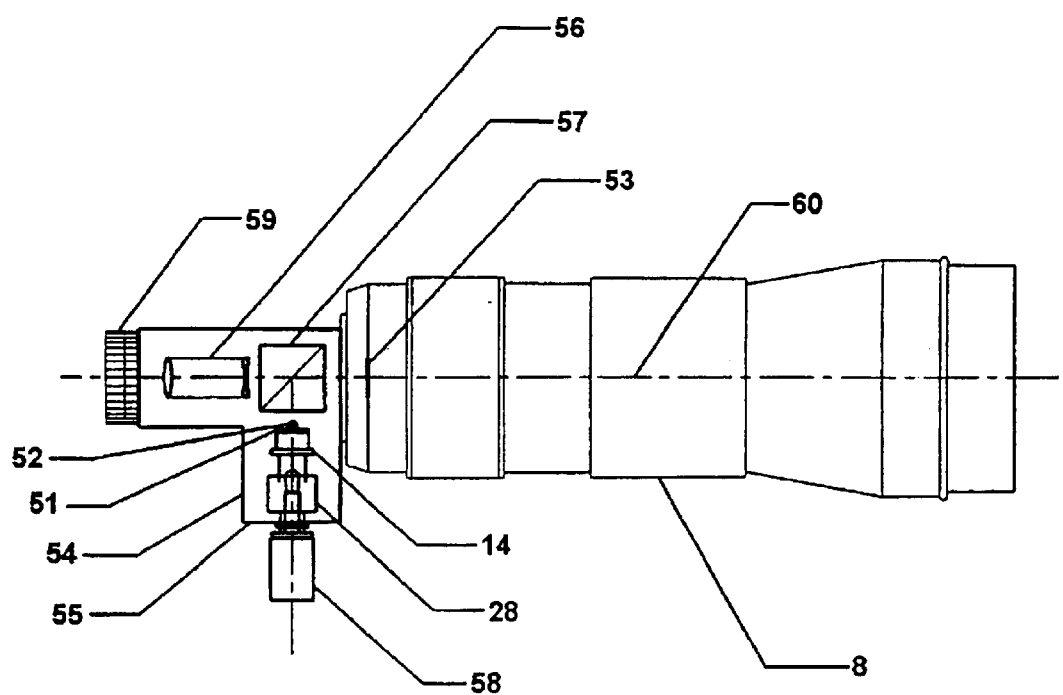
FIG. 5 shows apparatus and its optics of the present invention attached to an optical theodolite between the theodolite eyepiece and the theodolite telescope and having converted the optical theodolite to a laser/optical theodolite.
Figure 6:
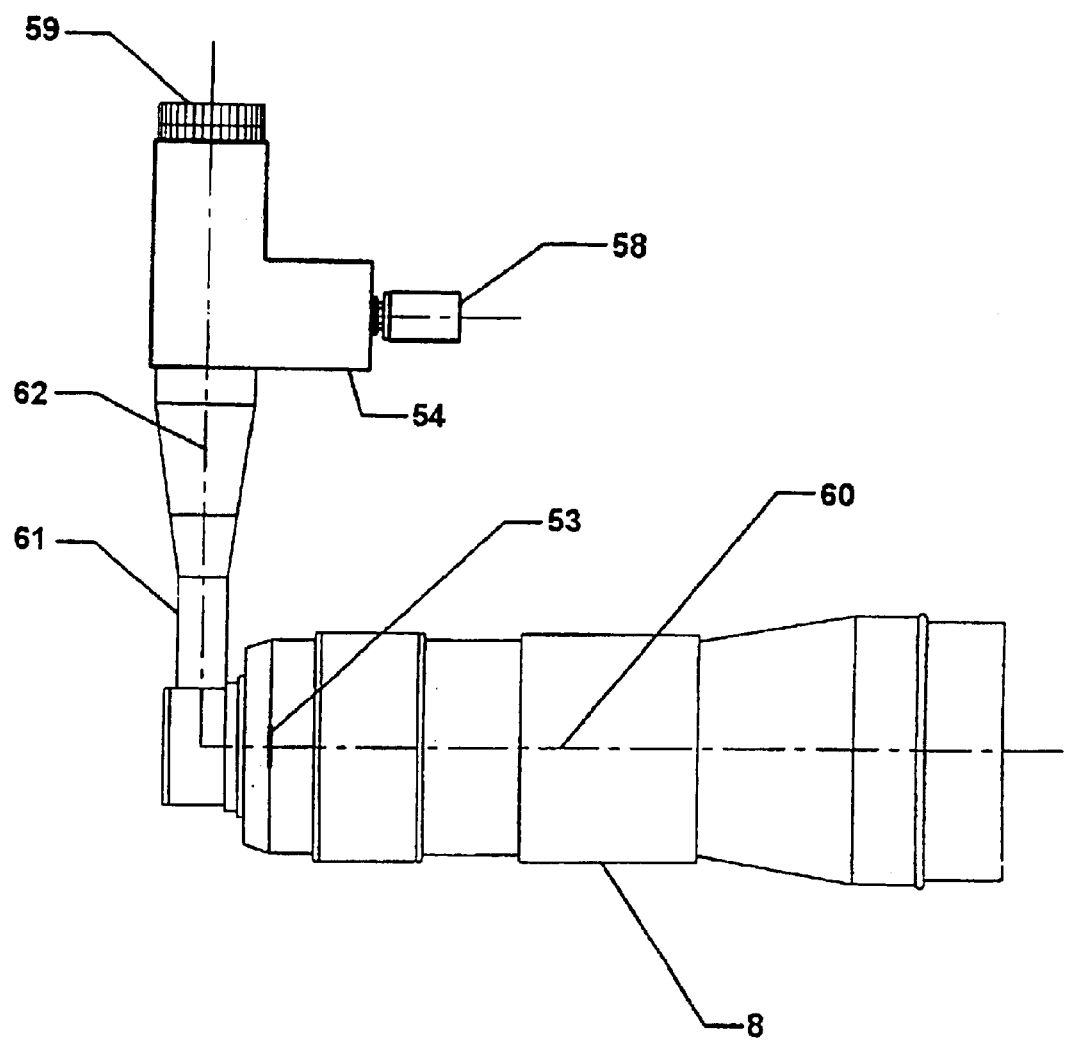
FIG. 6 shows the same apparatus shown in FIG. 5 attached to an optical theodolite between the theodolite eyepiece and the theodolite diagonal eyepiece which is attached to the theodolite telescope and having converted the optical theodolite to an optical/laser theodolite.

Referring now to FIGS. 5 and 6, there is shown a theodolite telescope 8, which was part of an optical theodolite but has been converted by apparatus 54 into an optical/laser theodolite telescope.

As shown in FIG. 5, the apparatus 54 hereafter referred to as the laser adapter 54, has been connected to the telescope 8 in place of the eyepiece 59. The eyepiece 59 has been moved to the other end of and attached to the laser adapter 54.

As shown in FIG. 5, the laser adapter 54 comprises a housing 55, an extension lens 56, a beam splitter 57, a focusing lens 52, a holographic image reshaping lens 51, a laser diode 14, and a power input socket 28 in the housing 55, and an external power jack 58.

As best seen in FIG. 5, the optical axis of the extension lens 56 and the beamsplitter 57 are aligned with the optical axis of the eyepiece 59 and the optical axis 60 of the telescope 8. The extension lens 56 is located such that it extends the focal place of the eyepiece 59 so that it may be focused on the reticle 53 that is a part of the telescope 8.

Also as best seen in FIG. 5, the optical axis of the focusing lens 52, the holographic image reshaping lens 51 and the optical axis of the laser diode are placed inline such that they intersect the optical axis of the beamsplitter 57 and make a 90 degree turn and remain inline with the optical axis 60 of the telescope 8 or, as best shown in FIG. 6, the optical axis 62 of the diagonal eyepiece 61. The focusing lens 52 is placed such that it will focus the laser beam emitted from the laser diode 14 in the plane of the reticle 53. The holographic reshaping lens 51 is placed such that it will convert the natural elliptical shape of the laser beam emitted from the laser diode 14 into a circular beam.

The housing 55 accommodates the eyepiece 59 on one end by way of a female threaded fastener of the same thread form as the eyepiece 59. The opposite end will accommodate the telescope 8 as best seen in FIG. 5, or the diagonal eyepiece 61, as best seen in FIG. 6, by way of a male thread form that matches the female thread form of the telescope 8 or the female thread form of the diagonal eyepiece 61.

As best seen in FIG. 6, in order for the telescope 8 to pass through the yoke of the theodolite, a diagonal eyepiece 61 may be fitted to the telescope 8. Under those conditions where it is necessary to use the laser adapter 54, the laser adapter 54 may be placed between the eyepiece 59 and the diagonal eyepiece 61.

The power jack 58 is placed into the input socket 28 and is connected to the driver circuit 32 to provide power to drive the laser diode 14. The remainder of the apparatus is as described above for FIGS. 2–4.

Generally, it will be seen from FIGS. 2–6 that the present invention provides for a laser adapter to be inserted between the telescope and the eyepiece for an existing theodolite. An adapter containing a low powered laser diode and associated optics is fitted to the internal thread of the theodolite telescope where the eyepiece of the theodolite would normally be. The eyepiece is then fitted to the laser adapter thus retaining the optical use of the theodolite while at the same time using the laser beam as a pointing device. The laser adapter uses the optics of the theodolite to provide a collimated beam of light that may be focused at a given distance. The laser diode and its associated optics are set to perfectly align with the telescope's optical path, thus insuring that the accuracy of the instrument is maintained for measuring purposes. In one configuration the adapter is limited in elevation due to interference with the yoke of the theodolite. However, in another configuration it may be placed between the eyepiece and a diagonal eyepiece so that it will not interfere with the yoke of the theodolite and may swing through its full sweep in elevation. The driver necessary for the laser diode is located in a separate package and is patched to the adapter by way of a patch cord. The placement of the driver package and the cord is placed such that it does not interfere with the full azimuth sweep of the theodolite. The driver package contains the driver circuitry, an on-off switch, an indicator light emitting diode, an output socket, and a power input socket. The driver package is small enough to be attached to the side of the theodolite by a fabric attachment patch. A low voltage power supply is used to convert the normal 120V AC power to a low volt DC power necessary to drive the laser diode.

It is to be appreciated that the embodiments of the invention described above with reference to the accompanying drawings have been given by way of example only and that modifications may be effected.

What is claimed is:

1. Apparatus for converting an optical theodolite into a laser theodolite, the theodolite having a support structure permitting movement of the optical parts relative thereto, so as to adjust elevation, which apparatus comprises a laser diode adapter which connects to the optical theodolite at the place normally occupied by an eyepiece of a telescope of the optical theodolite, and driver means for the laser diode adapter; the laser diode adapter comprising a housing having an externally threaded male coupling portion which matches the thread of the eyepiece and screws into the theodolite in the place normally occupied by the eyepiece, and a laser diode, a holographic image reshaping lens, and a focusing lens arranged within the housing effectively along the optical path of the telescope, the laser diode adapter being compact and the adapter housing being shaped to allow the theodolite to swing through a full sweep in elevation without interference by the housing with the support permitting theodolite movement; and the driver means having securing means which secures the driver means to the optical theodolite remote from the laser diode adapter.

2. Apparatus according to claim 1 in which the laser diode adapter and the driver means are connected by a cable which extends from an output socket on the driver means to an input socket on the laser diode adapter, in which the cable includes a swivel jack, and in which the input socket has a slot for permitting of swiveling of the swivel jack.

3. Apparatus according the claim 1 in which the laser diode adapter includes a beam splitter along the optical path of the laser associated elements and an extension lens in the housing and an eyepiece into the housing along an optical path intersecting the beam splitter such that the beam splitter extends both optical paths through the theodolite, and in which the laser diode adapter is constructed such that it retains the optical sighting ability of the telescope of the formed laser theodolite.

4. Apparatus according to claim 1 and including adjustment means on the laser diode adapter for adjusting the position of the laser diode in the housing such that the laser diode is able to be aligned with the telescope's optical path.

5. Apparatus according to claim 4 in which the adjustment means are adjustment screws between the adapter and the lenses.

6. Apparatus according to claim 1 in which the securing means is a releasable securing means which enables the driver means to be removed from the laser theodolite, stored when the apparatus is not in use, and to be re-secured to the laser theodolite for further use after the storage.

7. Apparatus according to claim 6 in which the releasable securing means is a male and female patch securing means.

8. Apparatus for converting an optical theodolite into a laser theodolite, which apparatus comprises a laser diode adapter which connects to the optical theodolite at the place normally occupied by an eyepiece of a telescope of the optical theodolite, and driver means for the laser diode adapter; the laser diode adapter comprising a housing, a laser diode, a holographic image reshaping lens, and a focusing lens in the housing, and an externally threaded male portion which screws into the telescope in the place normally occupied by the eyepiece and in which front face an undercut is provided adjacent the externally threaded male portion, the undercut being coaxial with and of smaller diameter than the threaded portion between the threaded portion and the front face of the housing; the laser diode adapter being compact and shaped such that the theodolite is able to swing through a full sweep in elevation; and the driver means having securing means which secures the driver means to the optical theodolite remote from the laser diode adapter.

* * * * *